H. RAU.
MULTIPLE MOLD CASTING APPARATUS.
APPLICATION FILED AUG. 14, 1920.
1,359,196.
Patented Nov. 16, 1920.
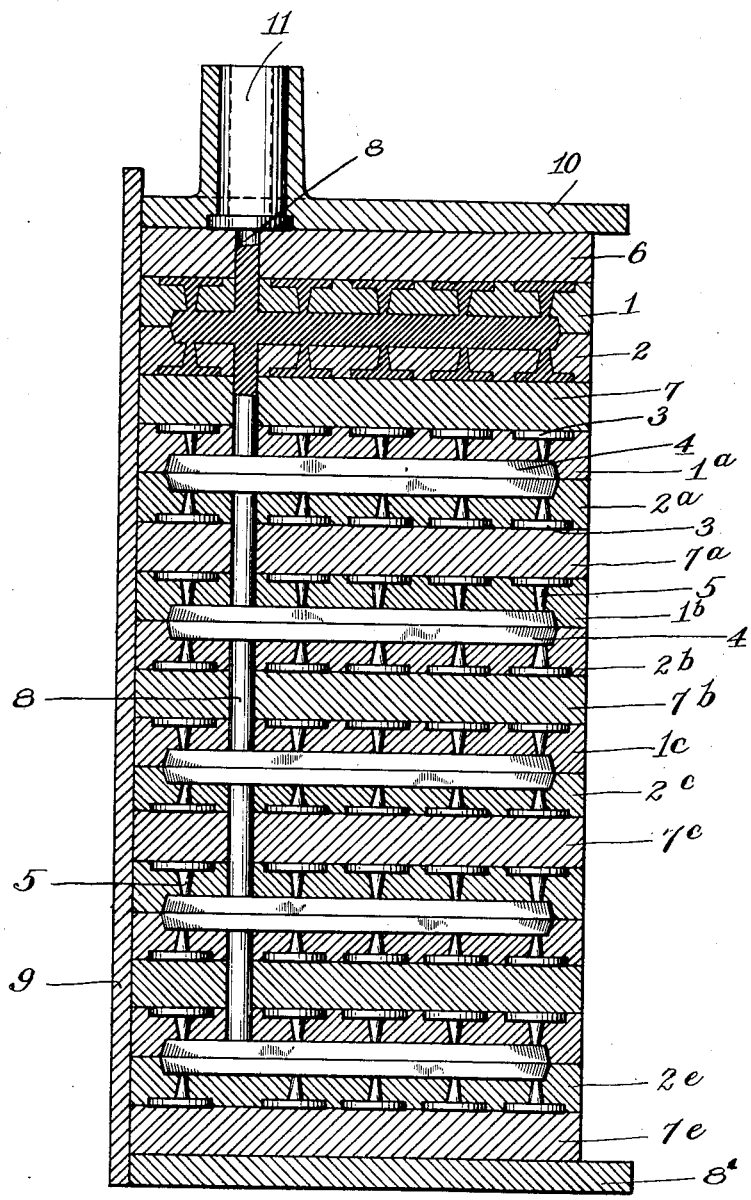
Inventor
Herman Rau
By his Attorney

UNITED STATES PATENT OFFICE.

HERMAN RAU, OF BROOKLYN, NEW YORK, ASSIGNOR TO DOEHLER DIE CASTING COMPANY, OF BROOKLYN, NEW YORK, A CORPORATION OF NEW YORK.

MULTIPLE-MOLD CASTING APPARATUS.

1,359,196.     Specification of Letters Patent.     Patented Nov. 16, 1920.

Application filed August 14, 1920. Serial No. 403,474.

*To all whom it may concern:*

Be it known that I, HERMAN RAU, a citizen of the United States, residing in the borough of Brooklyn, county of Kings, city and State of New York, have invented certain new and useful Improvements in Multiple-Mold Casting Apparatus, of which the following is a specification.

My invention relates to multiple mold casting apparatus. My object is to provide apparatus by which the cost of production may be decreased when a plurality of castings are to be made at one time.

My invention eliminates one or more sections of a multiple mold casting apparatus in a method of procedure formerly employed. The method which has previously been used consists in producing what I may term one gate of castings by means of a three part mold. By this method a pair of mold sections are employed in one of which mold cavities may be formed adjacent the lower face of the mold section, in which the castings are formed, against the upper surface of the bottom mold section. The horizontal gate slot or cavity is provided in a third mold section which is positioned above the two mold sections previously referred to, this horizontal gate cavity being connected with the mold cavities by vertical passages. A vertical pouring gate or passage extends through this top section, to communicate with the horizontal gate slot or cavity referred to.

In accordance with my invention what I may term two gates of castings may be formed by a four-part mold, and correspondingly a larger number of castings may be formed by the use of a greater plurality of mold sections in vertical alinement, with a corresponding saving of mold sections. This is accomplished by forming the horizontal gate slot or cavity on the back of each mold section which has the mold cavities formed on the front portion thereof. With this procedure a pair of mold sections may be placed back to back so that the horizontal gate cavities of each will aline to form one gate cavity common to both mold sections, the mold cavities then being formed adjacent to the upper and lower surfaces of the upper and lower mold sections respectively. Plain slabs may then be positioned above the upper and below the lower mold sections referred to, and a vertical pouring opening formed through the upper slab and the upper mold section into communication with the horizontal gate opening. By this procedure the extra mold section which previously was used to provide the horizontal gate cavity is eliminated and the same number of castings may be formed, for example, with a four part mold as were previously formed by means of six mold parts.

This improved method of procedure reduces the cost of production of castings because less material is used in the molds, and less material and labor are used than formerly in making horizontal gate cavities for a series of molds. Also there is economy in the drying of the molds because of the saving of space previously occupied by the greater number of horizontal gate cavities. There is likewise a saving of labor and floor space needed for assembling and pouring the molds, and less material is needed for gate castings since the gate formerly needed for one mold will, under the present procedure, serve for two or more.

In order that a clearer understanding of my invention may be had attention is hereby directed to the accompanying drawing forming part of this application and illustrating one embodiment of my invention. In the drawing the figure represents a vertical section through a multiple mold casting apparatus comprising a considerable number of parts and illustrating one form of my invention.

In the apparatus shown in the drawing twelve gates of castings are formed by a nineteen part mold, it being understood however that this particular construction is to be considered merely as illustrative and not as a limitation of my improved apparatus.

Referring to the drawing, pairs of mold sections may be formed similar to the mold sections indicated at 1 and 2, the mold sections preferably being formed of a plastic composition such as one embodying plaster of Paris and asbestos, or the like. These mold sections are provided with mold cavities 3 adjacent to and opening at one horizontal surface of each, which may be termed the front surface of the mold section. Each of these mold sections is provided with a horizontal gate cavity or slot 4 formed adjacent to and opening at the opposite or rear face of the mold section. Vertical runs or passages 5 are provided to connect the various mold cavities with the horizontal gate cavities of each mold section.

The mold sections 1 and 2 are positioned back to back, that is, the mold section 1 may be positioned upon the mold section 2 so that the horizontal gate cavities 4 of the two sections will aline with each other and form a common gate cavity for the two sections, extending partly above and partly below the meeting plane of the two sections. A plain slab 6 may be positioned above the upper section 1 and a plain slab 7 may be positioned below the mold section 2. A vertical pouring opening 8 is provided through the slab 6 and through the upper mold section 1 into communication with the horizontal gate cavity which is common to sections 1 and 2. The molten metal then being poured through this pouring opening, the metal will flow into and fill the horizontal gate cavity 4, the vertical passages 5 connecting the same with the mold cavities 3, and the said cavities 3, as indicated in cross section in the upper portion of the figure.

In the case of a construction in which a considerable number of the mold sections are employed, as is indicated in the drawing, various pairs of mold sections similar to sections 1 and 2 may be employed, these mold sections being, for example, $1^a$, $2^a$, $1^b$, $2^b$, $1^c$, $2^c$, etc. The plain slab 6 is positioned above the top mold section 1 and the plain slab 7 below the mold section 2, as stated, slabs $7^a$, $7^b$, $7^c$, etc., being positioned beneath mold sections $2^a$, $2^b$, $2^c$, etc. The lowermost mold section having mold cavities formed therein, this mold section being indicated at $2^e$, is positioned upon a plain slab indicated at $7^e$, which may, in turn, rest upon a bottom plate 8' of cast iron or the like. Vertical pouring openings 8 are provided through all of these plain slabs and mold sections except the plain slab $7^e$ upon which the same rests, these vertical pouring openings all being in alinement and forming one continuous vertical passageway connecting together the various horizontal gate cavities 4.

I prefer to employ a vertical side member 9 against which one edge of each of the mold sections and slabs may be positioned. I also prefer to employ a top plate 10 of cast iron or the like having an ingate opening 11 extending vertically therethrough and connecting with the vertical passage 8 which extends through the various mold sections and slabs. The vertical passage 11 may, of course, be provided with a lining of suitable refractory material.

When the apparatus is thus assembled molten metal may be poured through the ingate 11, the metal filling all of the mold cavities, gates, etc., after which the apparatus may be taken apart.

What I claim is:

1. In multiple mold casting apparatus, the combination of a pair of mold sections extending horizontally and positioned one on the other, the upper one having a plurality of mold cavities adjacent its upper surface and the lower one a plurality of mold cavities adjacent its lower surface, said mold sections having jointly a horizontal gate opening extending on opposite sides of the meeting plane of said mold sections, said mold sections having vertical passages connecting said mold cavities and gate opening, and said upper mold section having a pouring gate extending from its upper surface to said horizontal gate opening.

2. In multiple mold casting apparatus, the combination of a pair of mold sections extending horizontally and positioned one on the other with plain slabs above and below the same, the upper and lower mold sections each having a plurality of mold cavities adjacent to and open at their upper and lower surfaces, respectively, said mold sections having alined horizontal gate openings, open at their meeting plane to form a cavity common to both mold sections and vertical passages connecting said mold cavities and gate cavity, and said upper slab and mold section having alined pouring openings extending therethrough into said horizontal gate cavity.

3. In multiple mold casting apparatus, a mold section of plastic composition, having a plurality of mold cavities formed adjacent to and open at one horizontal surface, a horizontal gate cavity formed adjacent to and open at the opposite surface, vertical passages connecting said mold cavities and gate cavity, and a vertical pouring passage extending from said first surface to said gate cavity.

4. In multiple mold casting apparatus, the combination of a plurality of pairs of mold sections, each pair extending horizontally one positioned on the other, each mold section of a pair having a plurality of mold cavities, adjacent to and opening at the upper surface of the upper mold section and the lower surface of the lower mold section, respectively, the mold sections of each pair having alined horizontal gate openings, open at their meeting plane to form a cavity common to both mold sections, with vertical passages connecting said mold cavities and gate cavity, said pairs of mold sections being arranged vertically one above the other, with a plain slab interposed between each pair and a plain slab above the uppermost mold section, said slabs and all of said mold sections having alined vertical pouring openings extending therethrough.

This specification signed and witnessed this 9th day of Aug., 1920.

HERMAN RAU.

Witnesses:
WILLIAM R. AHRBERG,
WILLIAM E. BAUERSCHMIDT.